Nov. 2, 1926.
T. W. CASE
SLOT UNIT
Filed June 1 1925     2 Sheets-Sheet 1
1,605,529
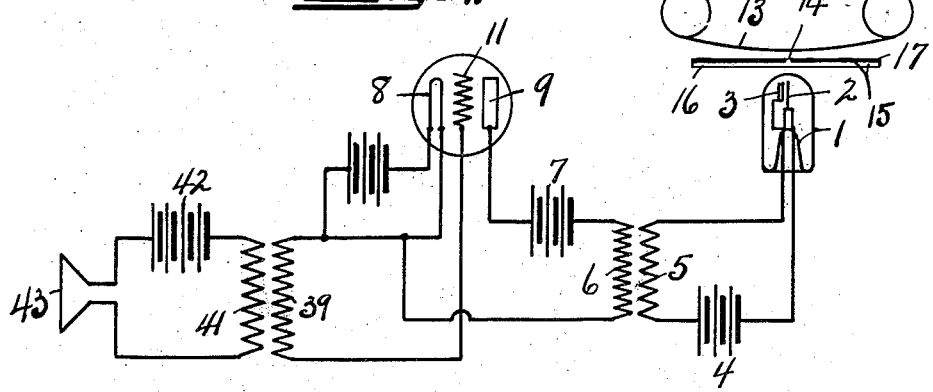

Nov. 2, 1926.
T. W. CASE
SLOT UNIT
Filed June 1, 1925
1,605,529
2 Sheets-Sheet 2
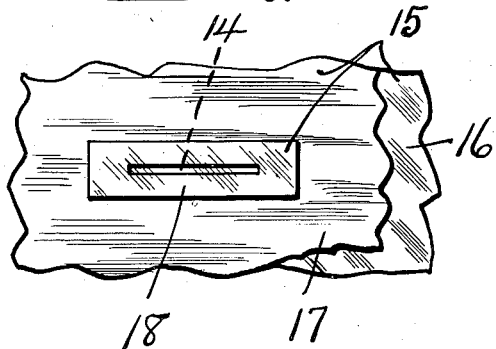
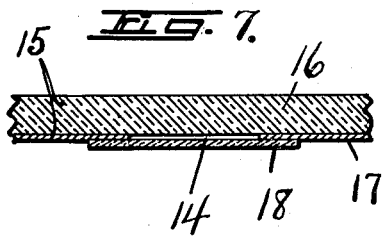
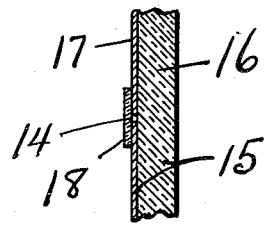
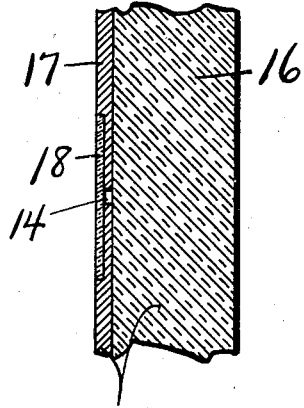
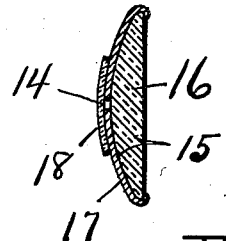
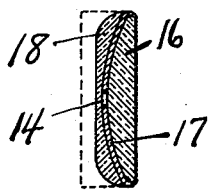
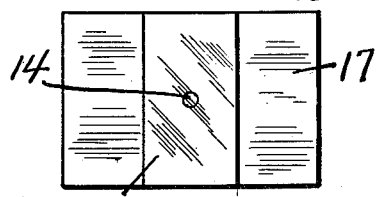
INVENTOR
Theodore W. Case
BY Denison Thompson
ATTORNEYS
WITNESS Patented Nov. 2, 1926.

1,605,529

UNITED STATES PATENT OFFICE.

THEODORE WILLARD CASE, OF AUBURN, NEW YORK, ASSIGNOR TO CASE RESEARCH LABORATORY INCORPORATED, OF AUBURN, NEW YORK, A CORPORATION OF NEW YORK.

SLOT UNIT.

Application filed June 1, 1925 Serial No. 34,206.

This invention relates to a certain new and improved apparatus for taking, printing, or reproducing a film record and is particularly designed for use in producing a film record of light variations as caused by electrical variations preferably corresponding to sound-wave variations, as for instance articulate sound waves, or for picture transmission or reception.

In apparatus of this character for producing or reproducing a film record of light variations, it has been customary to move the film past a small printing slot or opening in a wall disposed between the film and a source of light, and it is preferable that the film move past the slot in substantial contact with the wall so that only the portion of the film directly in front of the slot is exposed to the light emanating from the source, altho considerable spacing is possible under various conditions.

Considerable difficulty has been experienced in producing an accurate, clear and exact film record, and also in reproducing accurately the original sound from a record or in reproducing the original picture, due to the fact that dust, film material, or foreign matter collects in the slot,—more particularly as scraped off or left by the film as it passes by the edge of the slot, and this foreign material partially obstructs the slot which is extremely small, as for illustration, .001 of an inch in width and .1 of an inch in length, when used in talking picture work or the slot may be round or square, and of very small area as when used in transmitting or receiving pictures, and the result is that the film record produced is somewhat unsatisfactory because of this obstruction of the slot, and for the same reason a reproduction of even a perfect film record or picture is unsatisfactory, and the object of this invention is the production of an apparatus retaining all the advantages of present similar apparatus, but in which this disadvantage is partially or wholly avoided.

More especially this invention is addressed to the production of a slot-containing unit of novel construction and adapted for use in either picture-taking, picture transmitting or picture-reproducing apparatus, as above set forth, and to the method of producing such slot-containing unit.

Other objects and advantages relate to the details of the structure for effecting the main object of this invention, and to the particular method of producing the same, all as will more fully appear from the following description taken in connection with the accompanying drawings, in which:—

Figure 1 is a diagrammatic illustration of an apparatus for producing a film record of light variations as produced by electrical variations corresponding to articulate sound waves or musical tones.

Figure 2 is an elevation of a portion of the slot-containing unit.

Figure 3 is a longitudinal section through the slot containing unit as illustrated in Figure 2.

Figure 4 is a vertical section through the slot-containing unit illustrated in Figure 2.

Figure 5 is a diagrammatic illustration of an apparatus for reproducing sound waves from a film record.

Figures 6, 7 and 8 are views similar to views 2, 3 and 4 of a modified and perhaps preferred form of invention.

Figures 9 and 10 are further modified forms of the invention as illustrated in Figures 6, 7 and 8.

Figure 11 is a view of a further modified form.

Figure 12 illustrates a round slot in a unit of this invention.

In a general way, the structure of Figure 1 is the same as that disclosed in my application Serial No. 719,098 filed June 10, 1924, and comprises a variable source of cathode rays including two spaced electrodes —2— and —3— enclosed in a bulb —1—, the electrodes being connected in circuit with a source of potential, as a battery —4— and a secondary —5— of a transformer, the primary —6— of which is connected in circuit with a source of potential —7— across the filament —8— and plate —9— of a space discharge device —10—, the grid —11— of which is connected in circuit with the filament —8— and the secondary —39— of a transformer, the primary —41— of which is connected in circuit with a source of potential, as a battery —42— and a microphone 43.

In a general way, this structure includes means for varying an electric current in accordance with sound wave variations and for amplifying such variations, and thereby effecting amplified variations in the source of light —1—, the light rays emanating from which are adapted to be printed or photographed upon the film —13— which move continuously past the narrow slot —14— in the slot-containing unit 15. This slot containing unit 15 may be a portion of an enclosure for the film, or a portion of an enclosure for the lamp, and takes the place of the ordinary portion of a photographing apparatus or reproducing apparatus which contains the usual slot past which the film should continuously move.

This slot-containing unit is of novel manufacture and construction, and as illustrated in Figures 1 to 5, consists of a supporting sheet of transparent material, as the quartz or glass sheet —16— of any desired shape and size.

For the purpose of this disclosure, the word "glass" as used in the specification and claims hereof is deemed to include quartz. Upon one face of the glass piece —16— there is formed a thin layer —17— of opaque material, as for instance, a suitable metal preferably silver. This layer by my invention can be made extremely thin down to the point where it is still opaque and the layer should not be thicker than .001 of an inch, altho preferably not thicker than .0005 of an inch. This layer of metal is produced upon the glass in such a way that it may be made exceedingly thin, as described, and is strongly adhered to the quartz or glass. When a metal such as silver is used, it is deposited upon the glass in the form of minutely sub-divided particles. The layer —17— of metal may perhaps preferably be evaporated upon the glass sheet —16— or may be deposited electrically, chemically or by cathode sputtering thereon so as to form a thin coating or sheet of opaque material upon one side of and firmly adhered to the surface of the glass plate.

Any suitable opaque material may be utilized for this purpose, but I have found that silver is peculiarly adapted for this use, and a very thin layer of silver is highly efficient for the purpose of this invention. In the drawings it has been desirable to exaggerate the thickness of the component parts of the unit for the purposes of clarity.

When the thin coating of metal has been deposited upon the glass in any suitable manner, as for instance, one of those described, a slit or slot of desired size is ruled in the metal. In other words, a small portion of the metal is scraped off the glass sheet —16— so as to expose a portion of the glass through the metal, and this may be effected in any suitable way as by a tool, or diamond point, or the like, and in such a manner as not to scratch the glass or other transparent material used, so as to produce a sharply defined slot or opening through the metal of a proper length and width, a size suitable for talking picture purposes being .001 of an inch in width and .1 of an inch in length, while very small round or square slots are used for picture transmission or reproduction.

The structure so far described constitutes a highly efficient slot unit for use in connection with a constantly moving film, either in printing or reproducing a sound record, or transmitting or reproducing a picture The slit is covered upon one side by the transparent plate —16— and is of such extreme thinness as to avoid many of the disadvantages of present slot-containing structures.

However, a much preferred and highly improved structure of slot unit is produced when the slot —14— is provided with a further covering on the side opposite the transparent sheet —16— and such a structure is illustrated in Figures 6 to 10 inclusive.

In these structures the slot —14— is covered with a strip or sheet —18— of transparent material, as perhaps mica or glass. This strip or sheet —18— of glass or other usable transparent material may be of any suitable area so long as it is larger than the slot —14— and is adapted to be secured to the metal layer or sheet —17— in any suitable manner, as by a paste, cement or glue, such as for instance, Canada balsam, so as to completely cover the slot.

The sheet —18— should, however, be of extreme thinness so as not to space the film which moves past the slot upon the same side as the sheet —18— any substantial distance from the slot, and I have found a sheet of glass or mica .001 or less of an inch in thickness effects excellent results in this arrangement.

In the use of mica the sheet —18— may be formed of the required thickness and may then be secured in desired position. In the use of glass for the sheet —18— it is very desirable to cement the glass to the metallic layer —17— and then subsequently grind the glass, to the desired extreme thinness over the slot, all as described in the claims of an application filed of even date herewith.

In Figure 9 the sheet 18 as shown is inset within a recess within the metallic layer 17, and for this purpose it may be necessary to form the metallic layer of greater thickness than in the other forms of the structure, but of equal thinness beneath the sheet —18—.

Figure 10 shows the face of the transparent sheet 16 as of curved form so that the deposited layer 17 is of similar form and the sheet or covering 18 is made to conform with the curvature of the metallic layer so that the film comes in contact only with that portion of the sheet 18 which overlies the slot 14.

In Figure 11 instead of the covered sheet 18 of Fig. 10 there is substituted a sheet concave on one side to fit the opaque layer 17 and flat upon its outer surface and ground down to desired thinness over the slot with the edges rounded off. Figure 10 illustrates a face view of a slot unit with a very small round slot.

It will appear from this description that the slot-containing unit comprises a very thin deposited layer of metal having a slot of required size therethrough and supported upon one side by a transparent plate such as a glass plate, which covers the slot. In the present preferred structure, the slot is covered upon the side opposite the transparent plate by means of another transparent plate or sheet which overlies the slot upon that side whereby the entrance of foreign matter to the slot is entirely prevented.

In Figure 5 the slot-containing unit 15 is constructed in the same manner as that described in connection with Figures 1 to 4 inclusive, but for the particular use there illustrated the light from a suitable source, as lamp —20— passes through the slot —14— formed in the metal layer 17, also passing through the transparent member 16, and then passes through the film 21 which constitutes the sound record, and strikes the light sensitive cell 22 which may be formed of any suitable material that varies its resistance in accordance with the intensity of the light to which it is subjected, as for instance, selenium. In all constructions, the slot unit may be on either side of the film, altho preferably on the gelatin side.

The light cell 22 may as shown be connected in circuit with a suitable source of potential, as battery 24 across the filament 25 and grid 26 of a spaced discharge device 27, the filament 25 and plate 28 of which device are connected in circuit with a source of potential as battery 29 and a translating device, as the telephone receivers 30.

For the purpose of compensating for variations in light cells as manufactured, or other varying conditions, a potentiometer 31 and a fixed resistance 32 may be placed across the filament and grid of the electron discharge device 27.

It will be obvious that by the method described, a slot containing unit is formed adapted to take the place of the usual slot, or the adjacent portion of any structure that incorporates such a slot, and through which the light is adapted to pass to a film in a substantially unobstructed manner, while at the same time the entry of foreign matter to the slot is prevented either by the scraping of the film across the edge of the slot as in the usual structure, or otherwise, and altho I have shown and described a specific structure as illustrative of an embodiment of my invention which is at present perhaps preferred, I do not desire to restrict myself to the details of the structure or the particular materials from which the same is formed, or to the exact form and relation of the parts, as various changes may be made within the scope of the appended claims.

I claim:

1. An apparatus for taking, printing or reproducing a film record comprising a wall having a narrow elongated slot therein and an extremely thin transparent sheet extending across the slot on the side past which the film is adapted to move, and with which sheet the film is adapted to contact in its movement, a transparent adhesive rigidly securing the sheet to the wall, and a second transparent sheet disposed upon the opposite side of the wall and covering the slot.

2. An apparatus for taking, printing or reproducing a film record comprising a wall of a thickness not substantially greater than .005 of an inch and having a slot therein, a transparent sheet of a thickness not substantially greater than .005 of an inch extending across the slot on the side past which the film is adapted to move, and with which sheet the film is adapted to contact in its movement, a transparent adhesive rigidly securing the sheet to the wall, and a second transparent sheet secured to the opposite side of the wall and covering the said slot.

3. An apparatus for taking, printing or reproducing a film record comprising a transparent support, a thin layer of an opaque material secured to said support and having a slot therethrough exposing the support, and an extremely thin transparent sheet extending across the slot on the side past which the film record is adapted to move, and with which sheet the film record is adapted to contact in its movement, and a transparent adhesive rigidly securing the sheet to the opaque layer.

4. An apparatus for taking, printing or reproducing a film record comprising a transparent support, a thin deposited layer of metal firmly secured to the transparent support and having a slot therethrough exposing the transparent support, and an extremely thin sheet of quartz extending across the slot on the side past which the film is adapted to move and with which sheet the film is adapted to contact in its movement, and a transparent adhesive rigidly securing the said sheet to the deposited layer.

5. An apparatus for taking, printing or reproducing a film record comprising a transparent support, a thin deposited layer of metal firmly secured to the transparent support and having a slot therethrough exposing the transparent support, and an extremely thin transparent sheet extending across the slot on the side past which the film is adapted to move and with which sheet the film is adapted to contact in its movement, and a transparent adhesive rigidly securing the said sheet to the deposited layer.

6. In a talking picture machine, a slit-containing structure past which slit a film is adapted to move in close relation, such structure including a transparent supporting wall and an extremely thin layer of metal deposited thereon, and having a narrow elongated slit formed therein.

7. In a talking picture machine, a slit-containing structure past which slit a film is adapted to move in close relation, such structure including a transparent supporting wall and an extremely thin layer of metal deposited thereon, and having a narrow elongated slit formed therein, and a thin transparent sheet secured across the slit on the side past which the film is adapted to move, and with which sheet the film is adapted to contact in its movement.

In witness whereof I have hereunto set my hand this 25th day of May 1925.

THEODORE WILLARD CASE.